US007774471B2

(12) United States Patent  
Jackson

(10) Patent No.: US 7,774,471 B2  
(45) Date of Patent: Aug. 10, 2010

(54) OPTIMIZED MULTI-COMPONENT CO-ALLOCATION SCHEDULING WITH ADVANCED RESERVATIONS FOR DATA TRANSFERS AND DISTRIBUTED JOBS

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 474 days.

(21) Appl. No.: 11/763,010

(22) Filed: Jun. 14, 2007

(65) Prior Publication Data

US 2007/0294408 A1 Dec. 20, 2007

Related U.S. Application Data

(60) Provisional application No. 60/804,842, filed on Jun. 15, 2006.

(51) Int. Cl.
*G06F 15/173* (2006.01)
(52) U.S. Cl. ........................................ 709/226; 709/229
(58) Field of Classification Search .................. 709/226, 709/229
See application file for complete search history.

(56) References Cited

U.S. PATENT DOCUMENTS

2002/0120741 A1* 8/2002 Webb et al. .................. 709/225
2004/0267897 A1* 12/2004 Hill et al. ..................... 709/217
2005/0278760 A1* 12/2005 Dewar et al. .................. 725/94
2006/0059253 A1* 3/2006 Goodman et al. ........... 709/223

OTHER PUBLICATIONS

Kichkaylo, Tatiana. 'Construction of Component-Based Applications by Planning' PhD Thesis, New York University, Dept. of Computer Science, published Jan. 2004, 234 pages.
Jia Yu et al. "Cost-Based Scheduling of Scientific Workflow Application on Utility Grids" pp. 140-147. E-Science and Grid Computing, First Internation Conference. Dec. 5, 2005.
Venugopal S. et al. "Cost-based scheduling for data-intensive applications on global grids" Jul. 24, 2005. High Performance Distributed Computing. Proceedings of 14$^{th}$ IEEE Internation Symposium on Research. pp. 310-311.
Cameron D. G. et al. "Evaluating scheduling and replica optimization strategies in OptorSim" Grid Computing, 2003. Proceedings. Fourth International Workshop on Nov. 17, 2003.

* cited by examiner

*Primary Examiner*—Frantz B Jean

(57) ABSTRACT

Disclosed are systems, methods, computer readable media, and compute environments for establishing a schedule for processing a job in a distributed compute environment. The method embodiment comprises converting a topology of a compute environment to a plurality of endpoint-to-endpoint paths, based on the plurality of endpoint-to-endpoint paths, mapping each replica resource of a plurality of resources to one or more endpoints where each respective resource is available, iteratively identifying schedule costs associated with a relationship between endpoints and resources, and committing a selected schedule cost from the identified schedule costs for processing a job in the compute environment.

25 Claims, 4 Drawing Sheets

OPTIMIZED MULTI-COMPONENT CO-ALLOCATION SCHEDULING WITH ADVANCED RESERVATIONS FOR DATA TRANSFERS AND DISTRIBUTED JOBS

PRIORITY CLAIM

The present application claims priority to U.S. Provisional Application No. 60/804,842 filed Jun. 15, 2006, the contents of which are incorporated herein by reference.

RELATED APPLICATIONS

The present invention is related to application Nos. 60/669,278 filed Apr. 7, 2005; 60/662,240 filed Mar. 15, 2005; PCT/US 05/08297 filed Mar. 11, 2005; U.S. application Ser. No. 11/276,856 filed Mar. 16, 2006. Each of these applications is incorporated herein by reference.

BACKGROUND OF THE INVENTION

1. Field of the Invention

The present invention relates to the scheduling and management of resources within a compute environment such as a grid or a cluster and more specifically relates to optimizing a multi-component co-allocation scheduling process with advanced reservations for data transfers and distributed jobs.

2. Introduction

Grids and clusters in the high performance computing context provide for multiple resources communicating via network. In this context, there may be many different scenarios in which jobs can be processed on such a compute environment, some more efficient than others. Often, such clusters and grids are expensive to maintain and operate, so even a small increase in efficiency can bring measurable benefits. Given the many different types of resources and different paths through a network grid or cluster to process both tasks and data transfers, what is needed in the art is an improved way to optimize the manner in which potential paths and actions are scheduled in the compute environment.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention relates to systems, methods, computer-readable media, and distributed compute environments for controlling one or more computing devices to optimize multi-component co-allocation scheduling with advanced reservations for data transfers and distributed jobs. The method comprises converting a topology of a compute environment to a plurality of endpoint-to-endpoint paths, based on the plurality of endpoint-to-endpoint paths, mapping each replica resource of a plurality of resources to one or more endpoints where each respective resource is available, iteratively identifying cost schedules associated with a relationship between endpoints and resources, and committing a selected cost schedule from the identified cost schedules for processing a job in the compute environment.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a series of endpoint-to-endpoint paths converted from a topology of a compute environment;

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
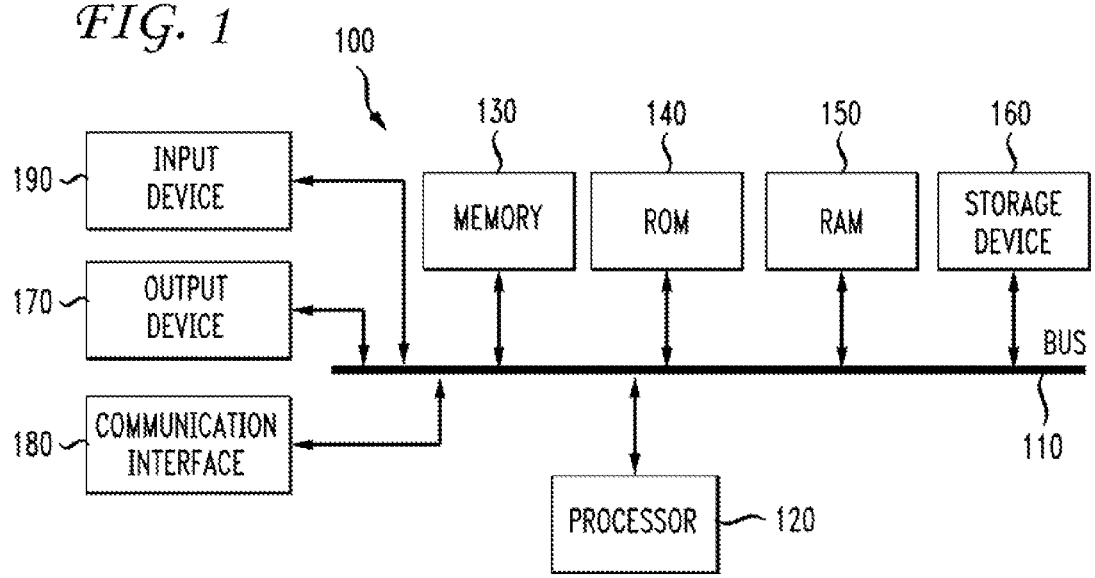
FIG. 1 illustrates a computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive, or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories RAMs), read only memory (ROM, a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

When management software performs evaluations of workload, the cluster/grid compute environment and jobs with reservations or jobs that are to consume resources, typically there is an issue when generating a best schedule for workload. In some cases, the scheduling process may not be scalable and may be out of reach for evaluation. For example, the workload software may take a lot of time to analyze the benefits to finally arrive at the solution. The software may be evaluating the schedule with every possible decision individually. The methods, systems, and computer readable media disclosed herein enable an aggregation of like or similar workload requests and use high level global information to determine scheduling constraints. The process enables the system to optimize on the total problem as opposed to individual optimizations of every subcomponent of the problem. One beneficial result is significant processor load savings and reduction in time to perform the best schedule analysis.

The concepts disclosed herein generally apply to an environment with multi-component co-allocation requirements and multiple potential paths/action for fulfilling these requirements (i.e., aggregating a set of data files to a single location in a data replication environment or distributing a set of tasks in a parallel computing environment). Such an environment may be generally referred to as a cluster or grid, although any distributed computing environment may utilize the principles of this invention, including collaborative networks. An example of workload management software that may utilize the principles of this invention includes but is not limited to the Moab software from Cluster Resources, Inc.

In this environment, each task is of equivalent or similar value (i.e., one task or one data transfer is not of value until all tasks or data transfers are complete) and each data transfer/task has a potentially varying cost (i.e., execution time or transfer time). For example, a cost value may be assigned to each data transfer or job task based on any number of factors, examples of which include the execution time for the task or the transfer time for the data to be transferred to staged in order for it to be processed.

Figure 2:
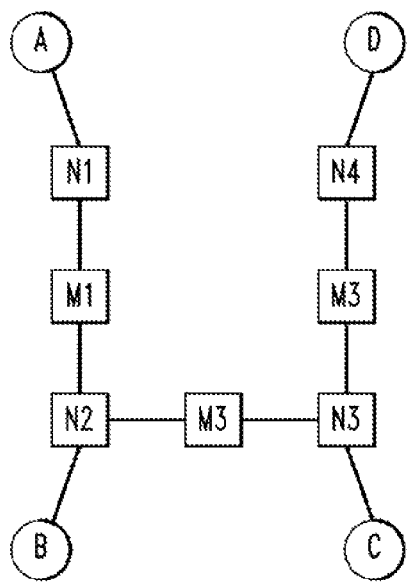
FIG. 2 illustrates an example compute environment associated with the invention.

FIG. 2 illustrates a compute environment with various resources endpoints. The endpoints A, B, C and D may be nodes in a cluster or clusters themselves or any resource such as computer memory, a contiguous segment of memory of a certain size, a provisioning server, particular CPU instruction sets, and so forth. The nodes N1-N4 and M1, M2 and M3 generally refer to transfer/network/other resources such as nodes and so forth which communicate data between the endpoints A, B, C and D. FIG. 2 is meant to generically illustrate one example of how multiple end points may be linked in a compute environment. Of course, many other configurations will also apply to the invention, including topologies well-known in the art such as rings, meshes, buses, stars, trees, and other network topologies. A topology may be on a wide-area or a local-area network. A topology may be contained within one physical computer, as in a computer with multiple CPUs with individual caches and other resources, each CPU comprising an endpoint in the topology and the computer's internal bus comprising the network. A topology may also contain several other topologies nested within layers of abstraction. For example, a top-level topology may be a star, each endpoint comprising a network with a ring topology. The level of depth required when discussing a given network's topology may be variable depending on the needed resources and where they are located in the network.

In the environment shown in FIG. 2, a job exists which requires a resource, for example compute time, at one of the endpoints (i.e., A, B, C, or D) and transfer of resources/data to a selected endpoint. The selected endpoint which receives a transfer of resources may be the same compute resource required by the job or a different endpoint. To accomplish the completion of the job, which will require both a data transfer analysis and a data space analysis to evaluate the compute environment such that the job can be processed in an optimal way, there may be several ways to do this. For example, assume that as a solution in the data space, management software, such as Cluster Resources Inc.'s Moab software, may select endpoint C and transfer files D1-D15 to C. Or, as a solution in the distributed task space, the management software may select endpoint C as task source and distribute tasks D1-D15 across A, B, C, and D where using the replica mapping below, D1 can execute on A and B, where D2 can execute on C, etc.

Figure 4:
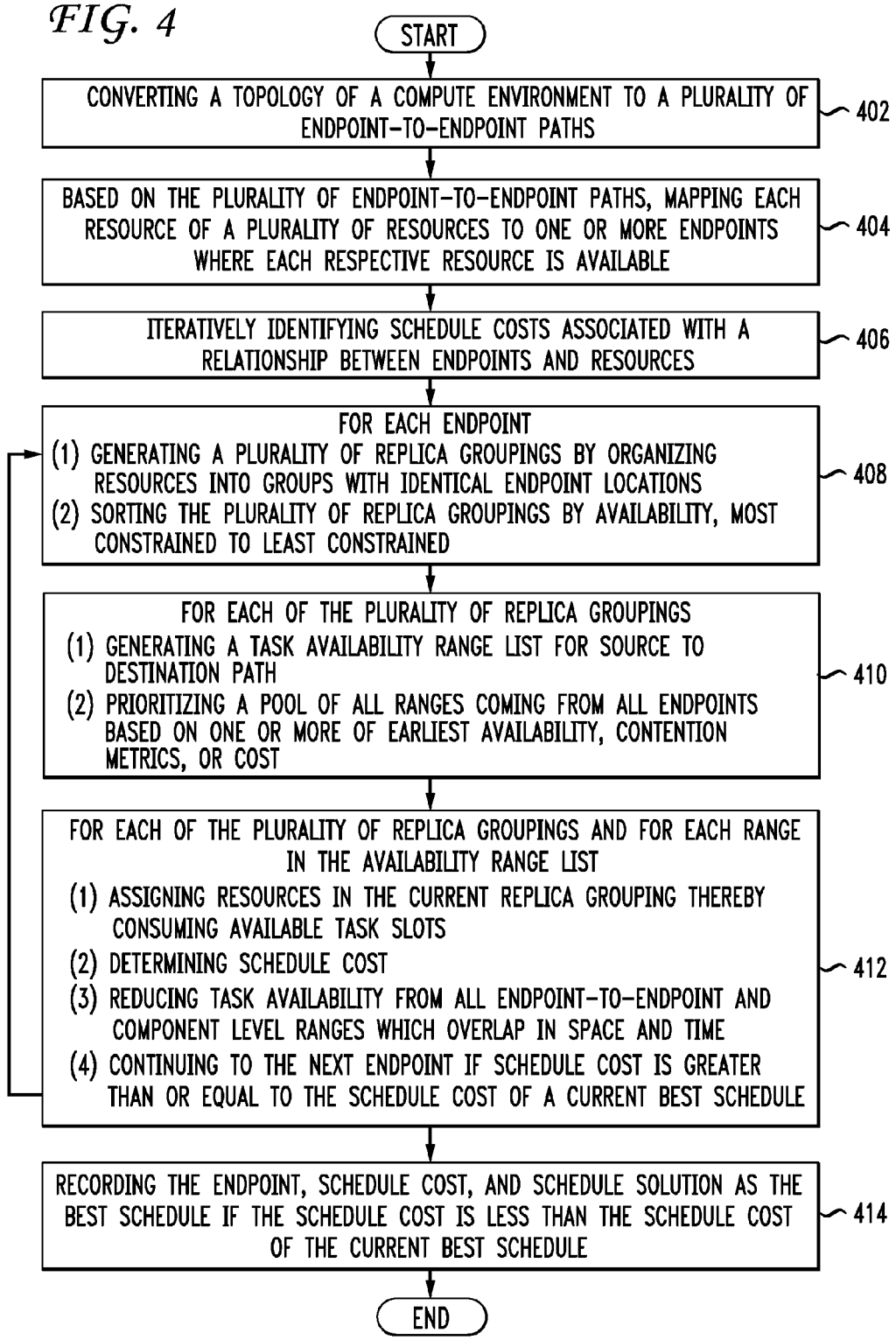
FIG. 4 illustrates a method embodiment of the invention.
Figure 5:
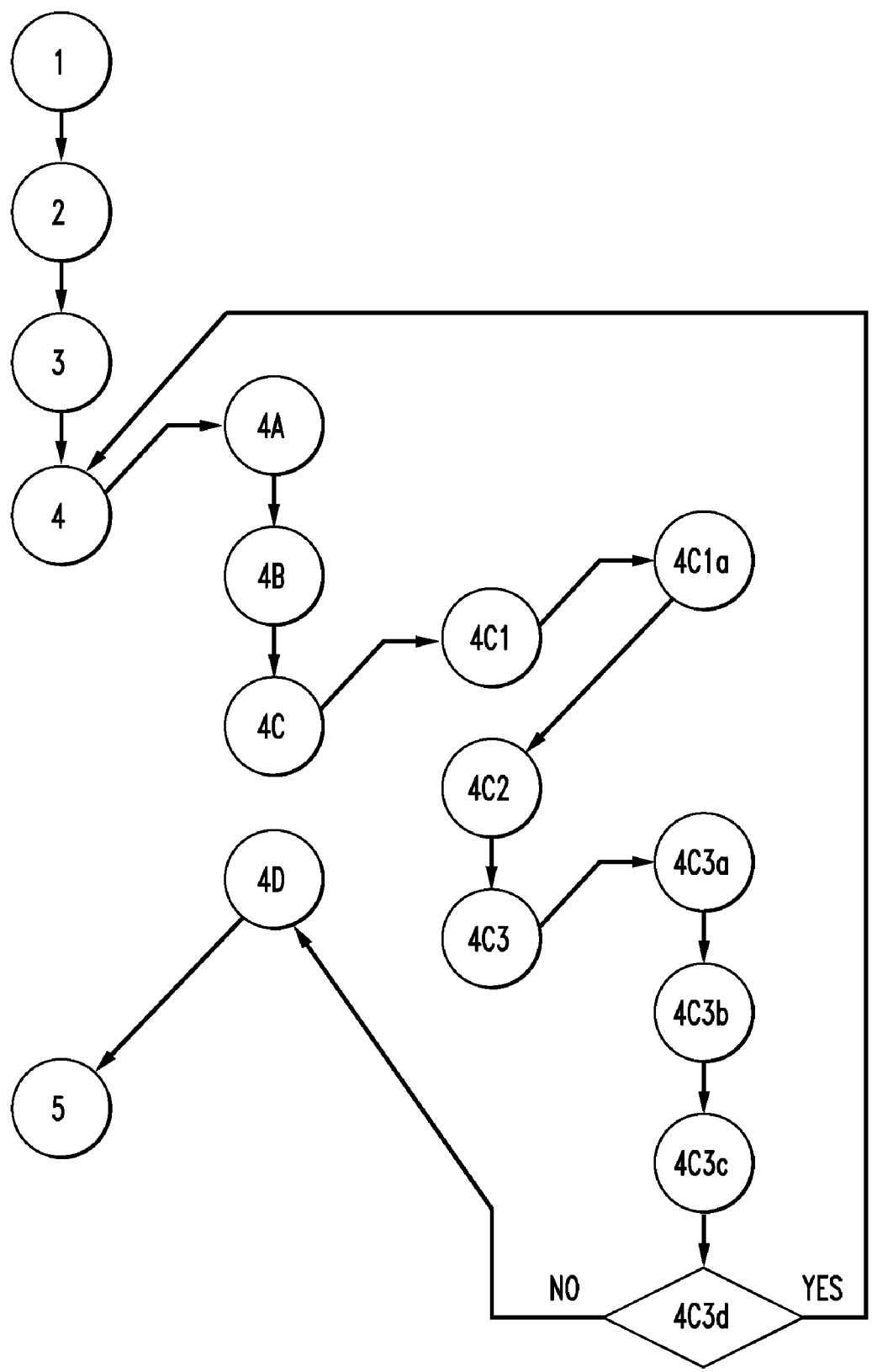
FIG. 5 illustrates another method embodiment of the invention.

A more general method embodiment of the invention is shown in FIG. 4 and a more detailed flowchart with five steps including a number of substeps is shown in FIG. 5. A method embodiment of the invention relates generally to the steps set forth herein to analyze a job and compute environment to determine whether an improved schedule solution is best for committing a job having a resource compute requirement and a data transfer requirement. Generally, the method comprises identifying or establishing a schedule for a job to consume resources in the compute environment.

The example as discussed shows how the method could be used to identify and commit the best schedule for a job. While often the best schedule is the desired schedule, it may not always be so. The method could be used to identify all schedules within a range of execution times and allow a user to select one of the schedules to commit. The method could allow for instructions to avoid or favor certain endpoints or groups of endpoints. A favored endpoint could simply be a very high-capacity endpoint that is capable of servicing many requests simultaneously, where a resource is first requested from a favored endpoint if the resource is available at the favored endpoint. While favoring or avoiding may be desirable, in some cases, where the resource is only available at one endpoint, avoiding the endpoint may not be an option. Similarly, if an endpoint is favored, but contains no resources applicable to the job at hand, then a favored endpoint would go unused.

The particular user may have credentials that do not allow them to obtain the "best" schedule. Any number of parameters may be involved in selecting the appropriate schedule to commit for a particular user or job. Even though the exemplary method describes how to select the best schedule for a job, other schedules may be selected. For example, in a grid or cluster compute environment, resources of the grid or cluster may be for lease. In such a situation, the tasks of higher paying customers might be afforded higher priority and higher efficiency, while the tasks of lower-paying customers might be relegated to using whatever resources are available as efficiently as possible without interfering with others' tasks. When a customer requests a lease of resources of the grid, an array of possible schedules could be generated and presented to the customer with different price points and expected levels of performance. Not all jobs are created equal and the best or optimal schedule may not always be selected.

The method comprises converting a topology of a compute environment to a plurality of endpoint-to-endpoint paths (402), based on the plurality of endpoint-to-endpoint paths, mapping each replica resource of a plurality of resources to one or more endpoints where each respective resource is available (404), and iteratively identifying schedule costs associated with a relationship between endpoints and resources (406). Replica resources are mapped by indicating which resources are identical, equivalent, or sufficiently equivalent and which endpoints contain the like resources. A dynamic or static threshold may be employed to determine whether or not data are equivalent or sufficiently equivalent. For example, if a job is intended to report sales statistics updated in real-time, the threshold for equivalence may be very high, i.e. data that are 3 days out of date may be insufficiently equivalent. If a job is intended to report annual sales statistics, then data that are 3 days out of date may be sufficiently equivalent.

Another example may be a job intended to perform multimedia encoding which requires a particular instruction set on a CPU of an endpoint. If the job requires the SSE2 instruction set to process properly, then an endpoint with support for the SSE3 instruction set could be an equivalent or sufficiently equivalent resource because SSE3 supports all the instructions of SSE2 plus additional ones. An endpoint with support for the SSE instruction set would not be sufficiently equivalent because the SSE instruction set contains an incomplete subset of the instructions of SSE2.

Then, for each endpoint, the method comprises the steps: (1) generating a plurality of replica groupings by organizing resources into groups with identical endpoint locations, and (2) sorting the plurality of replica groupings by availability, most constrained to least constrained (408). Sorting from most constrained to least constrained means that the replica groupings which are available at the least endpoints are first (i.e. they are most constrained) and the replica groupings which are available at the most endpoints are last (i.e. they are the least constrained). Then, for each of the plurality of replica groupings, the method comprises the following steps: (1) generating a task availability range list for source to destination path, and (2) prioritizing a pool of all ranges coming from all endpoints based on one or more of earliest availability, contention metrics, or cost metrics (410).

For each of the plurality of replica groupings and for each range in the availability range list (1) assigning resources in the current replica grouping thereby consuming available task slots, (2) determining schedule cost, (3) reducing task availability from all endpoint-to-endpoint and component level ranges which overlap in space and time, and (4) continuing to the next endpoint if schedule cost is greater than or equal to the schedule cost of a current best schedule (412).

Next the method comprises recording the endpoint, schedule cost, and schedule solution as the best schedule if the schedule cost is less than the schedule cost of the current best schedule (414).

Figure 3:
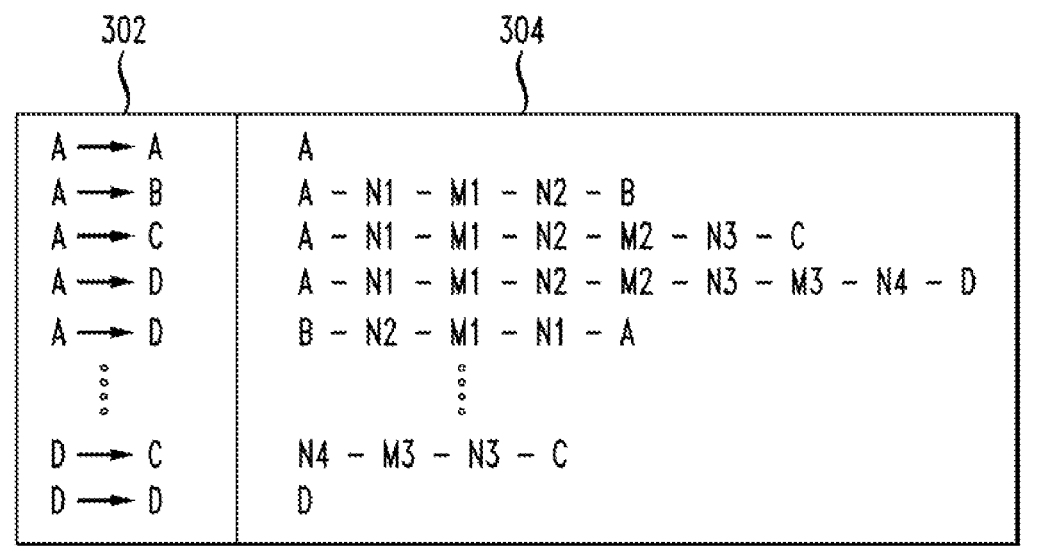

FIG. 5 provides a more detailed example of a method embodiment of the invention with the five basic steps, including a number of sub-steps associated with step 4. Steps are referred to as Step 1, 2, 3, 4, 4A, 4A1 and so on. Corresponding steps are shown in FIG. 5. Step 1 of FIG. 5 represents converting a topology of a compute environment to a plurality of endpoint-to-endpoint paths. FIG. 3 illustrates a series of endpoint-to-endpoint paths 304 converted from a general topology 302 of a compute environment. In this example, assume that there are files D1-D9 that are stored on various nodes and that need to be transferred for staging and processing as part of a job.

This conversion may be accomplished with an algorithm such as Path [X,Y] which retrieves information about the compute environment and generates the endpoint-to-endpoint paths 304. For example, [X,Y] may relate to paths that were specified previously with actual real values. This topology conversion may be a preliminary step to a method embodiment or may be part of a method embodiment. For example, the topology conversion data may be supplied from another entity for use in the method. The method may be implemented as a software product for use on grids or clusters where the topology is already converted to a series of endpoint-to-endpoint paths.

Step 2 of FIG. 5 is mapping each replica resource of a plurality of resources to one or more endpoints where each respective resource is available based on the plurality of endpoint-to-endpoint paths. The next step involves contacting an information service (those of skill in the art will understand the availability of such an information service that can be queried to find the information needed to perform this step) to determine all potential sources of equivalent resources or data. The other sources may have identical or sufficiently equivalent data or resources. This relates to a determination of a replica mapping. The following listing may provide a result of such replica mapping for files, tasks, or other resources labeled D1-D9. As shown, a cost is also assigned to each item wherein the cost may relate to any number of parameters such as executed time for a computer resource or transfer time for a communication resource. Each task may have a different cost as can be seen.

File D1 (cost=1) located on A, B
    File D2 (cost=2) located on A
    File D3 (cost=1) located on B, C, D
    File D4 (cost=4) located on A
    File D5 (cost=1) located on B, C
    File D6 (cost=8) located on B, C, D
    File D7 (cost=1) located on B, C
    File D8 (cost=2) located on A
    File D9 (cost=1) located on A, B, C, D Step 3 of FIG. 5 is ordering end point selection by a parameter, such as earliest completion time, best price, least resource cost, etc. This ordering may be done using one or more parameter such as earliest completion time, best price, least resource cost, lowest bandwidth used, etc. Any parameter or parameters may be used. The listing of potential parameters in addition to the ones explicitly mentioned here will be known to those of skill in the art. There may also be a separate cost for each A, B, C, and D.

Step 4 of FIG. 5 is performing a number of substeps. Substep 4A of FIG. 5 is generating a plurality of replica groupings by organizing resources into groups with identical endpoint locations. In this step the software collects all needed resources into groups with identical distributions, that is, resources that are available in the same set of one or more endpoints are grouped together. As an example based on the replica mapping above for files D1-D9:

A only: D2, D4, D8
B only: -
C only: -
D only: -
A, B: D1
A, C: -
A, D: -
B, C: D5, D7
B, D: -
C, D: -
A, B, C: -
A, B, D: -
A, C, D: -
B, C, D: D3, D6
A, B, C, D: D9

The second substep (4B) is sorting the plurality of replica groupings by availability, preferably most constrained to least constrained. The most constrained grouping may be sorted first. The sample replica groupings above are already sorted in this manner. In the above example of replica groupings, the replica groupings are sorted single-source availability first followed by dual-source availability, then triple-source availability, etc. Sorting the replica groupings may be done by one or more of these parameters such as constraint level, most constrained first, etc. Other parameters may be used as well to sort the replica groupings, alone or in combination. For example, if the resources associated with the replica groupings are files which may be easily duplicated, the replica groupings could be sorted according to availability and file duplication or distribution speed in appropriate situations. One appropriate situation might be when a needed resource is a file that is only available at one endpoint and the endpoint has the ability to quickly duplicate the file to many other endpoints, making the file much more available. In like situations, sorting based on availability alone may not be efficient. Replica groupings may also be sorted by some other parameter like user credentials.

The third substep (4C) of FIG. 5 involves a further set of substeps applied to each of the plurality of replica groupings. The first of the further set of substeps (4C1a) is generating a task availability range list for source to destination path. One exemplary way to generate this task availability range list for the source to destination path is to use the path information listed in FIG. 3, determine co-allocation task availability and report as both individual (i.e. per resource) and total end-to-end ranges.

The second of the further set of substeps (4C2) is prioritizing a pool of all ranges coming from all endpoints based on one or more of earliest availability, contention metrics (over lapping with other ranges, historical resource contention metrics, current utilization, etc), cost metrics, or other parameters. These and other parameters may be utilized to generate the prioritized pool of all the ranges. Any one or more of the parameters may be used in the analysis.

The third of the further set of substeps (4C3) comprises yet more substeps to be applied for each replica grouping in the sorted list, and further for each range in priority sorted availability range list. The first substep (4C3a) is assigning resources in the current replica grouping thereby consuming available task slots. In this way, the most constrained resources are "consumed" for the job at hand, while others which are less constrained happen later. The second substep (4C3b) is determining schedule cost. The determined schedule cost may be recorded. The determined schedule cost may be based on last task to start, last file to transfer, total cost of consumed or allocated resources, allocated resource usage, constraints, or other relevant factors. The third substep (4C3c) is reducing task availability from all endpoint-to-endpoint and component level ranges which overlap in space and time. Direct subtraction of range taskcount will work. Several notes associated with step 4C3c provide further information. If block frequency==0 over time and monitored utilization is low, one example optimization may be to mask or temporarily remove the resource from the series of endpoint-to-endpoint paths, like the one shown in FIG. 3. A simple case is to sort ranges in completion time order. Consumption of one range will affect availability of another if overlap exists. An endpoint-to-endpoint range is preferably associated with a full path. Tasks available within overlap component (Toc) may be reduced by tasks allocated. Tasks available within overlap end-to-end range (Te) may be set to the lower of Te and Toc. Both time and space overlap must exist before reduction is mandatory.

The fourth substep (4C3d) is continuing to the next endpoint if schedule cost is greater than or equal to the schedule cost of a current best schedule. If schedule cost (i.e., latest current transfer, total schedule contention, or total resource cost) exceeds the cost of the current best endpoint based schedule, the evaluation of current endpoint is aborted because the current endpoint is less desirable than the current best schedule.

The next step (4D) is recording the endpoint, schedule cost, and schedule solution as the best schedule if the schedule cost is less than the cost of the current best schedule.

Finally, the fifth step (5) is committing the selected cost schedule from the identified cost schedules for processing a job in the compute environment. An additional way to select a cost schedule could be to record all cost schedules in addition to the best cost schedule and soliciting user input to select a cost schedule from a list of all the cost schedules, and committing the user selected cost schedule for processing a job in the compute environment. In other variations, the committed cost schedule could be selected job by job based on job priority or some other factor or factors.

The claimed distributed compute environment may be a single computer with multiple CPUs or multiple CPU cores on one CPU. An example of current technology capable of containing a distributed compute environment is an Intel Quad-Core Xeon E5310 which has multiple CPU cores and independent caches on one physical CPU. The multiple cores may serve as endpoints and data stored in the caches may serve as resources. The claimed compute environment may also cover clusters, grids, server farms, datacenters, personal area networks, or any other distributed compute environment known in the art or hereafter discovered.

The invention may be carried out as a method as set forth above, or a computing device or group of computing devices that store modules programmed to perform the functions of the method. Programming may be accomplished using any programming language, for example C or Java. In this regard the system embodiment may be a single computing device that manages the scheduling of jobs on a compute environment, the system embodiment may be the compute environment itself, such as, for example, a cluster or a grid, or the system embodiment may be a component or components of the compute environment. There is no restriction on the particular type or configuration of system applicable to the present invention.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, those of skill in the art will recognize other parameters that may be used when doing some of the analysis discussed above. All such parameters and combinations of parameters are considered within the scope of this invention. The invention may also be broader in the sense that not every step may be required and generalizations of a single or multiple steps may be made. Accordingly, the claims and their legal equivalents should only define the invention, rather than any specific examples given.

I claim:

1. A method of establishing a schedule for processing a job in a compute environment, the method comprising:
converting a topology of a compute environment to a plurality of endpoint-to-endpoint paths, wherein the compute environment comprises compute resources that are reserved by a workload manager;
based on the plurality of endpoint-to-endpoint paths, mapping each replica resource of the compute resources to one or more endpoints where each respective resource is available;
iteratively identifying schedule costs associated with the one or more endpoints; and
committing a selected schedule cost from the identified schedule costs for processing a job using reserved compute resources based on the committed selected schedule cost in the compute environment.

2. The method of claim 1, wherein the plurality of compute resources contains different resources, each having at least one endpoint associated with the respective resource.

3. The method of claim 1, wherein mapped replica resources may be identical or wherein mapped replica resources may be determined to be sufficiently similar by a similarity analysis based on a static or dynamic threshold.

4. The method of claim 1, wherein each resource of the plurality of resources is one of data, a file, a portion of a file, bandwidth, CPU time, a software environment, a processor instruction set, storage space, contiguous storage space, a license, or a database.

5. The method of claim 1, further comprising after mapping each compute resource and before iteratively identifying the schedule cost:
sorting the mapping of replica resources.

6. The method of claim 1, wherein iteratively identifying schedule costs further comprises:
generating a plurality of replica groupings by organizing resources into groups with identical endpoint locations;
sorting the plurality of replica groupings by availability;
for each of the plurality of replica groupings, generating a task availability range list for source-to-destination path;
for each of the plurality of replica groupings, prioritizing a pool of all ranges coming from all endpoints based on one or more of earliest availability, contention metrics, or cost metrics;
for each of the plurality of replica groupings and for each range in the availability range list:
(a) assigning resources in a current replica grouping thereby consuming available task slots;
(b) identifying the schedule cost;
(c) reducing task availability from all endpoint-to-endpoint and component level ranges which overlap in space and time; and
(d) continuing to a next endpoint if schedule cost is greater than or equal to the schedule cost of a current best schedule; and
replacing the best schedule with the identified endpoint, schedule cost, and schedule solution as the best schedule if the schedule cost is less than the schedule cost of the current best schedule.

7. The method of claim 6, wherein the plurality of replica groupings is sorted by constraint level from most constrained to least constrained.

8. The method of claim 6, wherein the pool of all ranges coming from all endpoints is prioritized based on one or more of earliest availability, contention metrics, cost metrics, or other parameters.

9. The method of claim 6, the method further comprising:
recording all schedule costs;
soliciting input from a user to select one of the recorded schedule costs; and
replacing the best schedule with the selected schedule.

10. The method of claim 6, wherein certain endpoints are favored or avoided based on one or more instructions.

11. A system for establishing a schedule for processing a job in a compute environment, the system comprising:
a module configured to convert a topology of a compute environment to a plurality of endpoint-to-endpoint paths, wherein the compute environment comprises compute resources that are reserved by a workload manager;
a module configured to map each replica resource of the compute resources to one or more endpoints where each respective resource is available based on the plurality of endpoint-to-endpoint paths;
a module configured to iteratively identify schedule costs associated with the one or more endpoints; and
a module configured to commit a selected schedule cost from the identified schedule costs for processing a job using reserved compute resources based on the committed selected schedule cost in the compute environment.

12. The system of claim 11, wherein the plurality of compute resources contains different resources, each having at least one endpoint associated with the respective resource.

13. The system of claim 11, wherein mapped replica resources may be identical or wherein mapped replica resources may be determined to be sufficiently similar by a similarity analysis based on a static or dynamic threshold.

14. The system of claim 11, wherein each resource of the plurality of resources is one of data, file, a portion of a file, bandwidth, CPU time, a software environment, a processor instruction set, storage space, contiguous storage space, a license, or a database.

15. The system of claim 11, the system further comprising after mapping each compute resource and before iteratively identifying the schedule cost:
a module configured to sort the mapping of replica resources.

16. The system of claim 11, wherein the module configured to iteratively identify schedule costs further comprises:
a module configured to generate a plurality of replica groupings by organizing resources into groups with identical endpoint locations;
a module configured to sort the plurality of replica groupings by availability;
a module configured to generate a task availability range list for source-to-destination path for each of the plurality of replica groupings;
a module configured to prioritize a pool of all ranges coming from all endpoints based on one or more of earliest availability, contention metrics, or cost metrics for each of the plurality of replica groupings;
a module configured to perform the following steps for each of the plurality of replica groupings and for each range in the availability range list:
(a) assign resources in the current replica grouping thereby consuming available task slots;
(b) identify the schedule cost;
(c) reduce task availability from all endpoint-to-endpoint and component level ranges which overlap in space and time; and
(d) continue to a next endpoint if schedule cost is greater than or equal to the schedule cost of a current best schedule; and
a module configured to replace the best schedule with the identified endpoint, schedule cost, and schedule solution if the schedule cost is less than the schedule cost of the current best schedule.

17. The system of claim 16, wherein the module configured to sort the plurality of replica groupings is configured to sort by constraint level from most constrained to least constrained.

18. The system of claim 16, wherein the pool of all ranges coming from all endpoints is prioritized based on one or more of earliest availability, contention metrics, cost metrics, or other parameters.

19. A computer readable medium storing a computer program having instructions for establishing a schedule for processing a job in a compute environment, the instructions comprising:
converting a topology of a compute environment to a plurality of endpoint-to-endpoint paths, wherein the compute environment comprises compute resources that are reserved by a workload manager;
based on the plurality of endpoint-to-endpoint paths, mapping each replica resource of the compute resources to one or more endpoints where each respective resource is available;
iteratively identifying schedule costs associated with the one or more endpoints; and
committing a selected schedule cost from the identified schedule costs for processing a job using reserved compute resources based on the committed selected schedule cost in the compute environment.

20. The computer readable medium of claim 19, wherein the plurality of compute resources contains different resources, each having at least one endpoint associated with the respective resource.

21. The computer readable medium of claim 19, wherein mapped replica resources may be identical or wherein mapped replica resources may be determined to be sufficiently similar by a similarity analysis based on a static or dynamic threshold.

22. The computer readable medium of claim 19, wherein each resource of the plurality of resources is one of data, a file, a portion of a file, bandwidth, CPU time, a software environment, a processor instruction set, storage space, contiguous storage space, a license, or a database.

23. The computer readable medium of claim 19, the instructions further comprising after mapping each compute resource and before iteratively identifying the schedule cost:
sorting the mapping of replica resources.

24. The computer readable medium of claim 19, wherein iteratively identifying schedule costs further comprises:
generating a plurality of replica groupings by organizing resources into groups with identical endpoint locations;
sorting the plurality of replica groupings by availability;
for each of the plurality of replica groupings, generating a task availability range list for source-to-destination path;
for each of the plurality of replica groupings, prioritizing a pool of all ranges coming from all endpoints based on one or more of earliest availability, contention metrics, or cost metrics;

for each of the plurality of replica groupings and for each range in the availability range list:

(a) assigning resources in a current replica grouping thereby consuming available task slots;

(b) identifying the schedule cost;

(c) reducing task availability from all endpoint-to-endpoint and component level ranges which overlap in space and time; and (d) continuing to a next endpoint if schedule cost is greater than or equal to the schedule cost of a current best schedule; and replacing the best schedule with the identified endpoint, schedule cost, and schedule solution as the best schedule if the schedule cost is less than the schedule cost of the current best schedule.

25. A distributed compute environment that consumes jobs, the distributed compute environment managing workload by establishing a schedule for processing submitted jobs according to a method comprising:

converting a topology of the distributed compute environment to a plurality of endpoint-to-endpoint paths, wherein the compute environment is controlled by a workload manager that reserves compute resources in the compute environment;

based on the plurality of endpoint-to-endpoint paths, mapping each replica resource of a plurality of compute resources to one or more endpoints where each respective resource is available;

iteratively identifying schedule costs associated with a relationship between endpoints and compute resources; and committing a selected schedule cost from the identified schedule costs for processing a job in the distributed compute environment.

\* \* \* \* \*